(12) United States Patent
Youngquist

(10) Patent No.: US 6,647,774 B1
(45) Date of Patent: Nov. 18, 2003

(54) AIRCRAFT WIND INDICATOR

(76) Inventor: John S. Youngquist, 899 Niagra Pkwy., Fort Erie, Ontario (CA), L2A 5M4

( * ) Notice: Subject to any disclaimer, the term of this patent is extended or adjusted under 35 U.S.C. 154(b) by 37 days.

(21) Appl. No.: 09/605,631

(22) Filed: Jun. 28, 2000

(51) Int. Cl.[7] .................... A63B 53/00; G06E 19/00
(52) U.S. Cl. ...................... 73/170.02; 73/170.01; 701/7; 701/14
(58) Field of Search ................ 73/170.02, 170.01; 340/975, 968; 349/58; 701/7, 14

(56) References Cited

U.S. PATENT DOCUMENTS

| | | | |
|---|---|---|---|
| 2,586,010 A | | 2/1952 | Divoll |
| 4,170,132 A | * | 10/1979 | Serley ................. 73/170.02 |
| 4,182,171 A | | 1/1980 | Looker |
| 4,531,793 A | * | 7/1985 | Hochgesang ............ 439/55 |
| 4,583,094 A | * | 4/1986 | Mosier ................. 340/967 |
| 4,626,851 A | | 12/1986 | Tooze |
| 4,866,852 A | * | 9/1989 | Plier .................. 33/1 MP |
| 5,134,394 A | | 7/1992 | Beadle |
| 5,616,860 A | * | 4/1997 | Morohoshi et al. ..... 73/170.14 |
| 5,639,964 A | * | 6/1997 | Djorup ................ 73/170.12 |
| 6,043,855 A | * | 3/2000 | Grave ................. 349/58 |
| 6,057,786 A | * | 5/2000 | Briffe et al. .......... 340/975 |

FOREIGN PATENT DOCUMENTS

| | | | | |
|---|---|---|---|---|
| JP | 357077970 A | * | 5/1982 | ........ 73/170.1 |
| JP | 360166869 A | * | 8/1985 | ....... 73/170.14 |

* cited by examiner

Primary Examiner—Edward Lefkowitz
Assistant Examiner—Lilybett Martir
(74) Attorney, Agent, or Firm—Nixon & Vanderhye PC

(57) ABSTRACT

Wind direction relative to an aircraft, wind speed and left/right wind correction angle data are derived and serially transmitted to an instrument panel indicator which simultaneously displays such data in a graphic visual format. A simple 2-wire interface provides both power and data to the indicator which includes on-board data processing/display driver capability on one side of a PCB with the driven display elements on the other side of the PCB. The entire integrated driver display unit can be made quite small and adhesively mounted in virtually any desired location (e.g., even on a portion of another instrument face) and connected to the power/data source via an almost transparent 2-conductor umbilical connection.

51 Claims, 14 Drawing Sheets

TAS: 100 KTS
WIND SPEED: 34 KNOTS
WIND: RIGHT CROSSWIND 45 DEGREES FROM AIRCRAFT HEADING
WIND CORRECTION ANGLE: 15 DEGREES RIGHT

TAS: 325 KTS
WIND SPEED: 58 KNOTS
WIND: RIGHT CROSSWIND 30 DEGREES FROM TAIL
WIND CORRECTION ANGLE: 5 DEGREES RIGHT

TAS: 80 KTS
WIND SPEED: 44 KNOTS
WIND: LEFT CROSSWIND 90 DEGREES FROM NOSE
WIND CORRECTION ANGLE: 35 DEGREES LEFT

AIRCRAFT WIND INDICATOR

BACKGROUND OF THE INVENTION

1. Field of the Invention

This invention relates to method and apparatus for displaying relative wind information to an aircraft pilot or co-pilot. The displayed wind information preferably includes wind speed and wind direction, head wind or tail wind components thereof and left or right correction angles for steering the aircraft accurately across a desired ground track in spite of the prevailing winds aloft encountered relative to the aircraft.

2. Description of the Prior Art

The following prior art issued US patents are examples of prior art aircraft instrumentation for depicting relative wind information:

U.S. Pat. No. 2,586,010—Divoll (1952)

U.S. Pat. No. 4,170,132—Serley (1979)

U.S. Pat. No. 4,182,171—Looker (1989)

Arguably also of relevance are patents such as the following even though they are not directed to displays of wind information:

U.S. Pat. No. 4,626,851—Tooze (1986)

U.S. Pat. No. 5,134,394—Beadle (1992)

Tooze uses a small microprocessor driven array of LEDs and suggests that his display might be overlaid with other primary aircraft cockpit displays and the like. However, Tooze does not appear to suggest that the microprocessor might be on the same PCB with the LED array—and certainly has no suggestion of a two-wire power/data interface nor any wind information display and certainly not the unique display format of the exemplary embodiment described herein below.

Beadle provides a digital LED display to be overlaid with a conventional cockpit instrument. However, the display format is entirely different from the present invention, has nothing to do with wind information, does not in any way suggest the use of a small microprocessor mounted on the same PCB as the LED array, does not in any way suggest a simple two-wire power/data interface, etc.

SUMMARY OF THE INVENTION

The generation of raw wind direction, speed, component, drift correction or display brightness data is already available (or can be conventionally made available) in serial form (e.g., a "TAS 1000 Air Data" computer available from Insight Avionics Inc., Box 122, Fort Erie, Ontario L2A 5M4, Canada).

The exemplary embodiment of this invention provides a small, thin, lightweight printed circuit board display having its own onboard microprocessor and LED array driven directly by the microprocessor. Both data and power can be conveyed over a single two-wire circuit (e.g., plus five volts, ground). Short interruptions in the power supply are interpreted as the serial data stream (different interruption durations representing a start data pulse, a data "0" pulse and a data "1" pulse). Even a very slow data rate (e.g., 20 bits per second) suffices to update the display of wind direction, wind speed, wind component, drift correction and display brightness (e.g., every 1.6 seconds when air data computer output is updated).

This simple two-wire combined power/data interface permits a very small interconnect ribbon to be the only interconnection of the PC board display unit to the driving apparatus. The small lightweight PCB (e.g., only 1.3 inches in diameter in the prototype) in a suitable housing may literally be glued or otherwise affixed onto the instrument panel (including even the face of another instrument) so as to literally require zero additional panel space in the aircraft. Such a ribbon two-wire connector may use conductors so small as to be substantially transparent. If desired, additional information (such as the output from an altitude encoder or error correction codes or the like) can be added to the bit stream.

The exemplary display format depicts wind direction in 15° increments around an outer circumference. Wind speed is shown as a second smaller circumference circular bar graph while the "drift" (i.e., the required steering crab angle to counteract the cross-wind component) is displayed as a horizontal bar graph to the right or left of center indicating corresponding wind correction angle to the left or right. The longitudinal head wind or tail wind component is also preferably displayed as a blinking (or missing) bar in the midst of the wind speed display. There are many possible variations in the display format. For example, some of the graphic displays could be replaced with numeric read-out displays In the exemplary embodiment, an aircraft wind indicator is provided by disposing wind display elements on one side of a printed circuit board while wind data processing and display driving circuits are disposed on the other side of the printed circuit board.

In the exemplary embodiment, the wind indicator is disposed in a housing of about 1.3 inches diameter with an adhesive pad on its backside for affixation to an aircraft instrument panel.

If desired, a two-conductor ribbon cable having a substantially transparent base may be used for simultaneously conducting both power and data to the indicator circuits. In this manner, the indicator housing itself may be affixed to the instrument panel in any desired location (even on the face of some other existing instrument such as in the center of an altimeter) without providing any substantial visual obstruction by the interconnecting electrical umbilical cable.

Preferably, the display elements are disposed so as to depict wind speed, wind direction and wind correction angle data. The display elements may be solid state LCD elements, digital numeric displays or light emitting elements such as light emitting diodes or the like. In the preferred exemplary embodiment, display elements are arrayed in two concentric circular tracks (for depicting wind direction and wind speed respectively) and in an linear track (for depicting left and right wind correction angles by bar graphs extending to the left or right of a central reference indicia). The magnitude of the head or tail wind component may be indicated by a blanked (or blinked) display element along the bar graph depicting the velocity of the winds aloft being encountered by the aircraft.

In another aspect, the exemplary embodiment of the aircraft wind indicator may merely include visible indicators disposed to display wind speed, wind direction and wind correction angle together with data processing and indicator driving circuits connected to drive such visible indicators in accordance with digital data representing such wind speed, wind direction and wind correction angle information. In the exemplary embodiment, the visible indicators include solid state light emitting elements arrayed on one side of a printed circuit board and data processing and indicator driving circuits disposed on the other side of the same printed circuit board. A translucent or transparent substrate may be imprinted with graphical symbols and aligned with light emitting elements that are selectively activated so as to display graphical depictions of such wind data.

In the exemplary embodiment, the indicator includes a serial data input port to data processing and light source driving circuits which, in turn, drive three respective arrays of controllable discrete light sources arranged to graphically depict wind direction, wind speed and wind correction angle data. A pair of electrical conductors may be used for supplying power to the indicator and data as well when represented by short coded interruptions in the power supply that can be interrupted to represent data such as "start" and digital "0" and digital "1" values. Although light emitting diodes are used in the presently preferred exemplary embodiment, other sources of display technology (e.g., liquid crystal display, cathode ray tube, plasma display, mechanical pointers, and the like) may also be used.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF EXEMPLARY EMBODIMENTS

Figure 1:
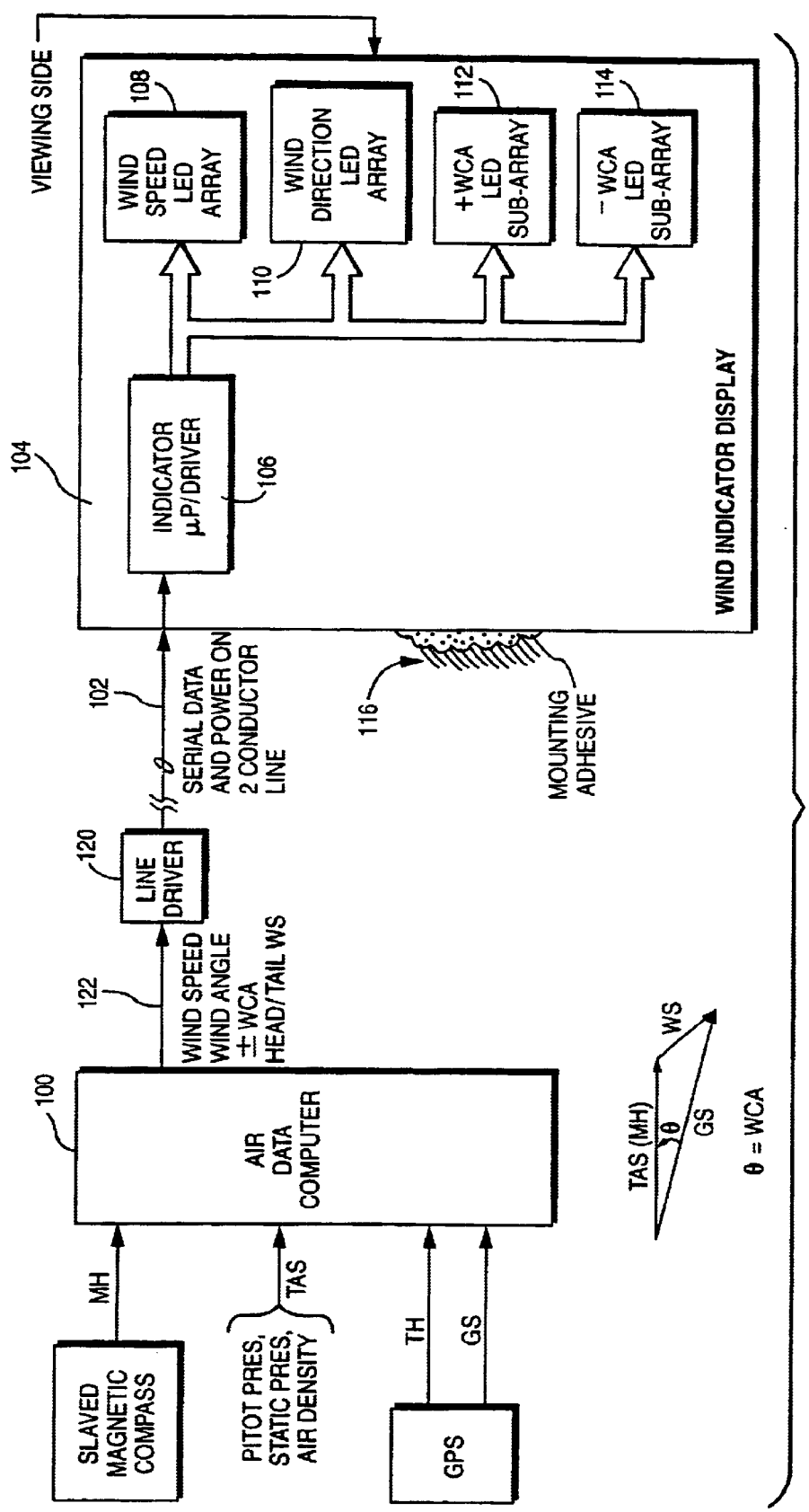
FIG. 1 is a schematic depiction of an overall system for generating serial wind data and for utilizing such data in an exemplary wind indicator display.

The purpose of the wind indicator is to display to the pilot of any aircraft the actual wind speed and direction of the winds aloft. It can in addition display wind component (head wind or tail wind) and a navigation correction angle. Its simple graphic format is unique. With special construction techniques this display can be as small as a US monetary quarter and actually stuck on the panel anywhere, including in the middle of an altimeter, airspeed indicator or VSI. It can actually take no extra panel space.

The wind information comes from an air data computer in serial form. Wind speed and direction can be derived from the vector difference of (aircraft heading and true air speed) and (aircraft track and ground speed). Aircraft heading can come from the slaved magnetic compass. True airspeed can be derived from pilot and static pressure and air density. Track and ground speed may come from the GPS.

The exemplary wind indicator is a graphical display providing a real time picture of wind speed and direction. An outer ring of arrows shows where the wind is coming from in 15 degree increments. An inner ring displays velocity (and effective head or tail wind component) in 2.5 knot increments up to a maximum of 100 knots. A linear row shows required correction angle for the current wind. Intercepting and tracking courses or localizers is easy with the wind indicator. Just add the displayed correction angle to the course.

The exemplary prototype uses an array of LED's on a small PCB about 1.3 inches in diameter. They are driven directly from a small micro-processor that has adequate current output to drive the LED's directly. It could use LCD elements (in conjunction with reflected or other light sources), CRT, Plasma, or even mechanical display technology.

The data and power are conveyed over a single wire pair. The serial data is sent as short interruptions in the 5 v supply of various widths. Three interruption widths are used: a start pulse (10 $\mu$sec), a data "0" (6 $\mu$sec), and a data "1" (3 $\mu$sec). The serial stream may be asynchronous without any restrictive timing requirements.

The data used may be calculated by an air data computer (or other appropriate aircraft data collection and processing device) periodically (e.g., once every 1.6 seconds) to provide an adequate updating rate. A data rate as slow as 20 bits/sec (or even slower) would suffice. The data can be sent redundantly at higher speed for error checking and correction.

The simple two wire interface (+5 v, gnd) allows for a tiny interconnect ribbon to be used for installations that adhesively affix the indicator on the center of another instrument face. This ribbon could be transparent. All the required data is sent in binary form over this interface. About 20 bits are required in the exemplary embodiment using the following format:

| Parameter displayed | Magnitude | Bits required |
|---|---|---|
| Wind direction | 0–23 | 5 |
| Wind speed | 0–199 | 8 |
| Wind component | 0–199 | 8 |
| Drift correction | 0–31 | 5 |
| Display brightness | 0–7 | 3 |

This interface may be shared by other devices such an altitude encoder interface, in which case other bits may be added. A checksum or CRC error detection code could also be added.

The display format could take a variety of forms. The current exemplary embodiment display shows wind direction in 15 degree increments by illuminating one of 24 LED's around the outside of the display. Wind speed is shown on the inner ring of LED's in a circular bar graph format. LED's light sequentially from 0–100 knots.

The magnitude of the head wind or tail wind component (which is always less than or equal to the wind speed) is displayed as a missing (or blinking) bar in the midst of the wind speed display. Various other combinations are practical, including a single bar for both speed and component, or various other blinking combinations. The speed could also be displayed in a numeric format or even by an analog needle like a regular airspeed indicator. The drift correction angle may be displayed as linear bar graph with a 5.0 degree per bar calibration. Elements illuminate in sequence from the center to show the required crosswind correction for tracking a course. Display intensity is controlled by duty cycle modulation. A 3 bit intensity word offers 8 levels of intensity each one half the previous for a 256 to 1 control ratio.

Referring to FIG. 1, air data computer 100 may be a stand alone separate data processor (e.g., such as the TAS 1000 available from Insight) or it may be a processor included in some other larger aircraft system component (e.g., a flight director, auto pilot, GPS, receiver/processor, etc.) as will be appreciated by those in the art. Using basic available data and well known conventional vector analysis, it computes and provides serial data output representing wind speed (WS), wind angle (with respect to geographical north, with respect to magnetic north, and/or relative to the aircraft heading) the required left or right wind correction angle (WCA) so as to maintain the aircraft along a desired ground track in spite of the encountered winds aloft as well as the head wind or tail wind component of the wind speed. Raw measured data such as the magnetic heading (MH) may be obtained from the slaved magnetic compass typically aboard the aircraft, the true air speed (TAS) may be obtained from some other device or may be computed from raw data representing the pilot tube pressure, the static tube pressure and the air density, temperature, etc. as will be appreciated by those in the art. The true heading (TH, i.e., ground track) and ground speed (GS) of the airplane is also typically available from instruments aboard the aircraft such as a GPS receiver.

The vector diagram included in FIG. 1 under air data computer 100 merely represents a conventional vector diagram where the true air speed and wind speed are added vectorially so as to provide the resultant ground speed. The angle between the aircraft magnetic heading (associated with its true air speed) and the ground track (associated with the ground speed) of the aircraft is the wind correction angle.

However conventionally derived, this serial wind data is supplied in the exemplary embodiment together with electrical power on a two conductor line 102 to the wind indicator display 104. Contained within the wind indicator display 104 are indicator and micro-processor/driver circuits 106 which drive the wind speed LED array 108, the wind direction LED array 110 and the wind correction angle LED sub-arrays 112 and 114. As depicted in FIG. 1, these LED arrays are visible through the viewing side of the wind indicator housing 104. Mounting adhesive 116 may be used on the back surface of the wind indicator housing 104 so as to affix it to any desired portion of the aircraft instrument panel (or elsewhere in the aircraft cockpit as may be desired).

Figure 1A:
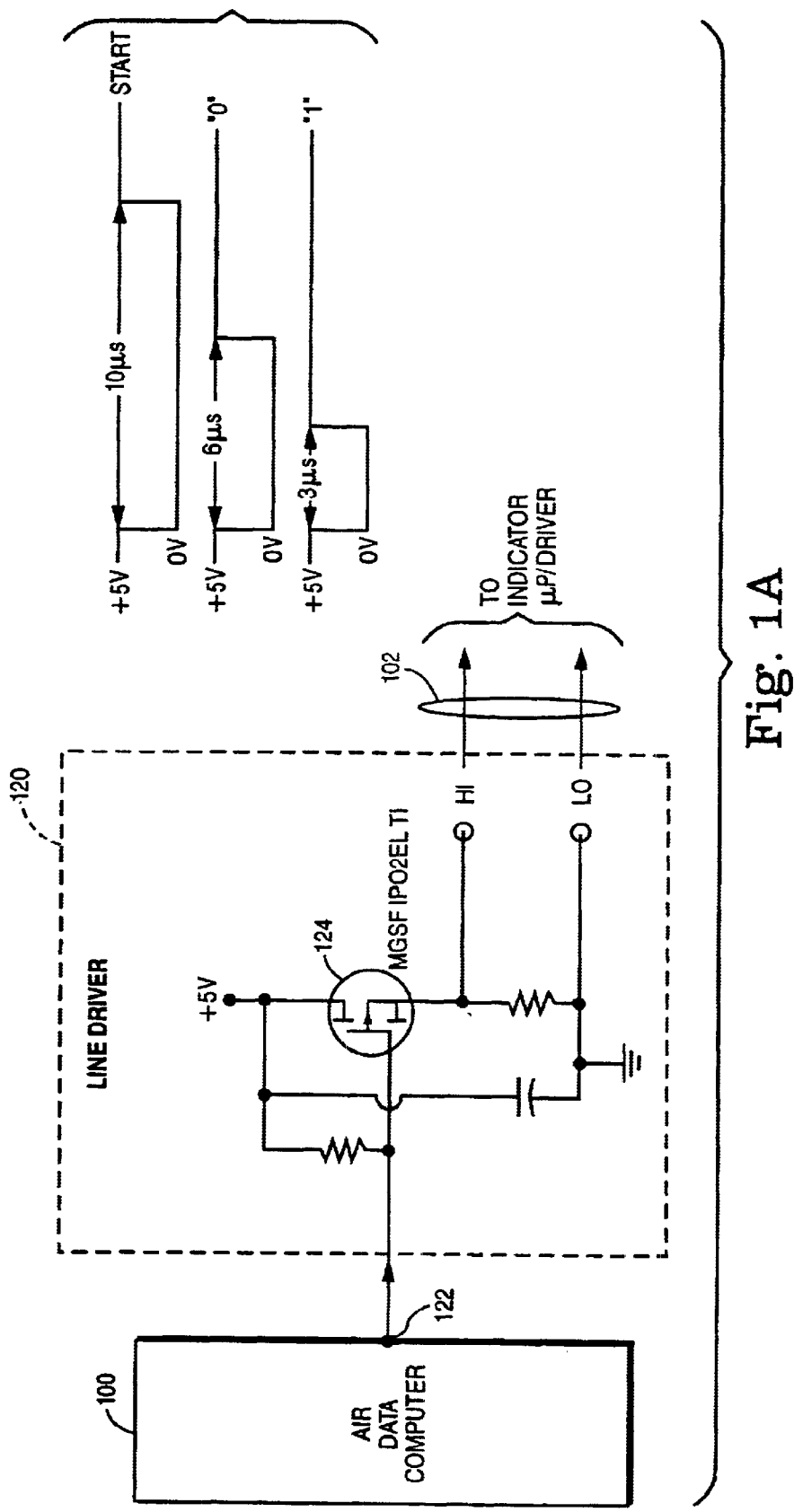
FIG. 1A is a more detailed schematic circuit diagram of an exemplary line driver for the exemplary embodiment of FIG. 1.

As depicted in FIG. 1A, the line driver 120 is connected to a suitable output port pin of the air data computer 100 via conductor 122. In the exemplary embodiment, the FET 124 is connected as a source-follower (analogous to a cathode follower or an emitter follower) so as to provide impedance isolation between the output port pin 122 of the air data computer 100 and the two conductor transmission line 102. As depicted in the fragmentary wave form diagrams, line 122 (and thus the "HI" line of pair 102) is normally maintained "high" so as to keep the FET 124 turned fully "on" and thus supply a five volt power supply over transmission line 102 to the indicator 104. However, for very brief intervals, this power supply may be interrupted by causing the output pin 122 to go low for a few micro seconds thus encoding data onto the power supply line. As depicted for the exemplary embodiment, a "start" signal is encoded as a ten micro second gap in the power supply while a "0" bit is represented by a six micro second gap in the power supply and a "1" data value is represented by a three micro second gap in the power supply.

Figure 6:
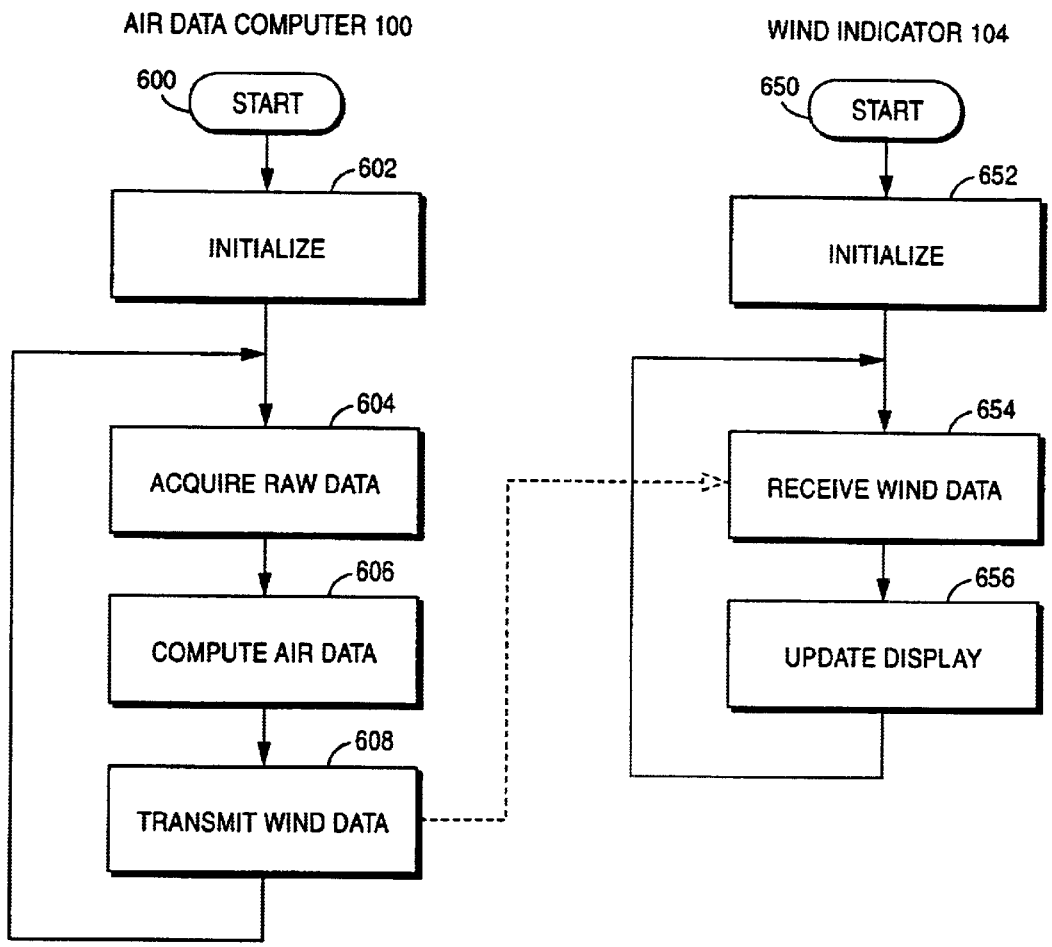
FIG. 6 is a simplified flow chart of the overall processes performed in the air data computer and in the wind indicator components of the exemplary embodiment in FIG. 1.

As depicted in FIG. 6, the program for the air data computer may start at 600 and go through conventional initialization processes at 602. Suitable raw data is acquired periodically at 604 and conventional vector analysis is performed at 606 so as to accumulate the desired wind data. At 608, the accumulated and calculated wind data is periodically transmitted to the wind indicator 104.

Figure 6A:
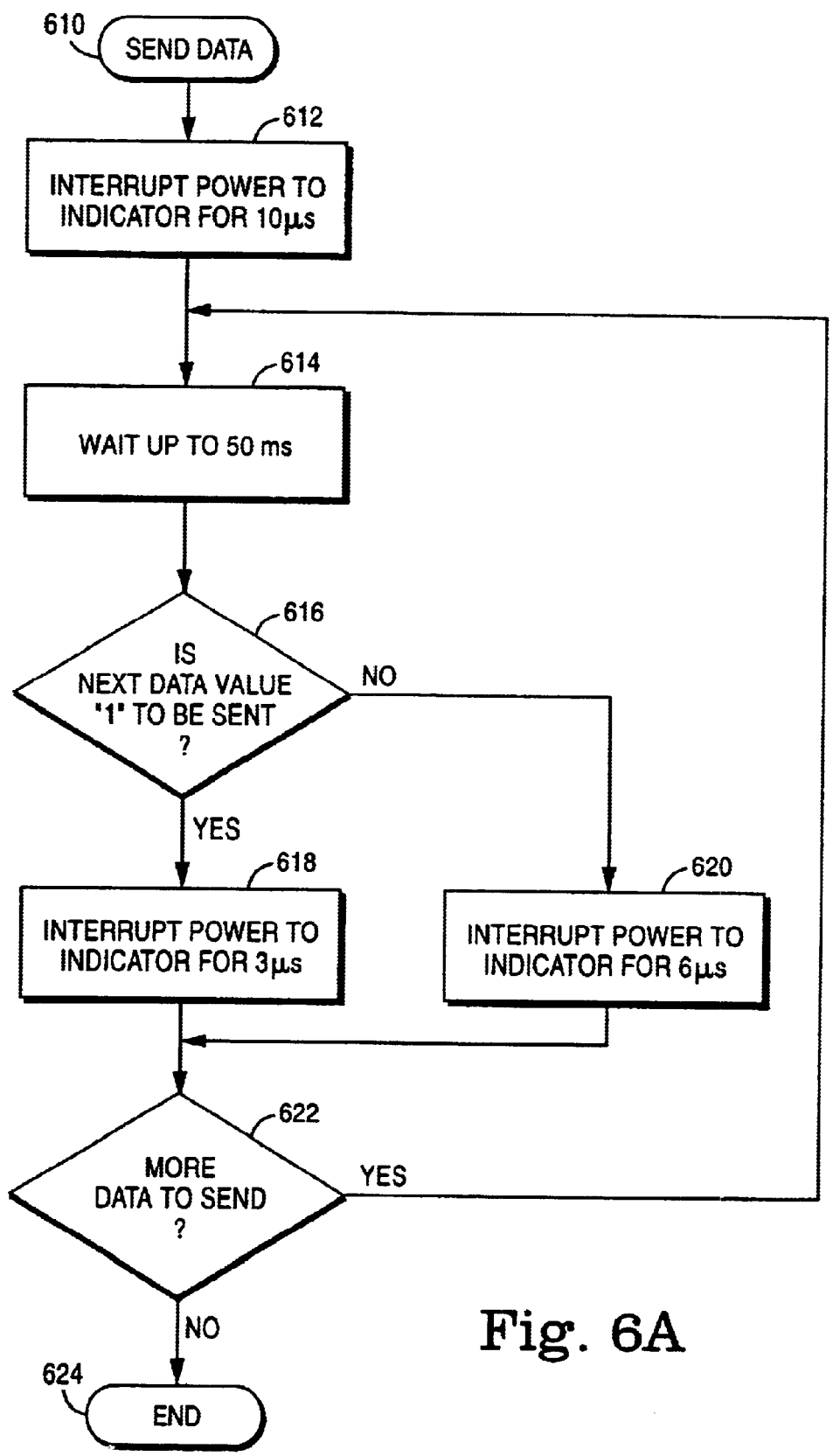
FIG. 6A is a simplified flow chart of a suitable program for use in the air data computer for sending data to the wind indicator.

A suitable algorithm for transmitting wind data at 608 is depicted in more detail at the flow chart of FIG. 6A. Here, when the send data routine is entered at 610, power is interrupted for ten microseconds at 612. Then, so as not to provide undue interruption, an arbitrary relatively long wait period of up to perhaps 50 milliseconds or so may be provided at 614. Then at 616, a determination is made as to whether the next data value is a "1" value. If so, then a branch is made to 618 where power is interrupted for three microseconds. If not, then a branch is made to 620 where power is interrupted for six microseconds (on the inference that the data value must therefore be "0" if it is not "1"). In any event, a decision is made at 622 as to whether or not there is any more data to send. If so, then a branch is made back to block 614 for another bit data sending cycle to be initiated. If not, then the send data sub-routine is exited at 624.

Figure 1B:
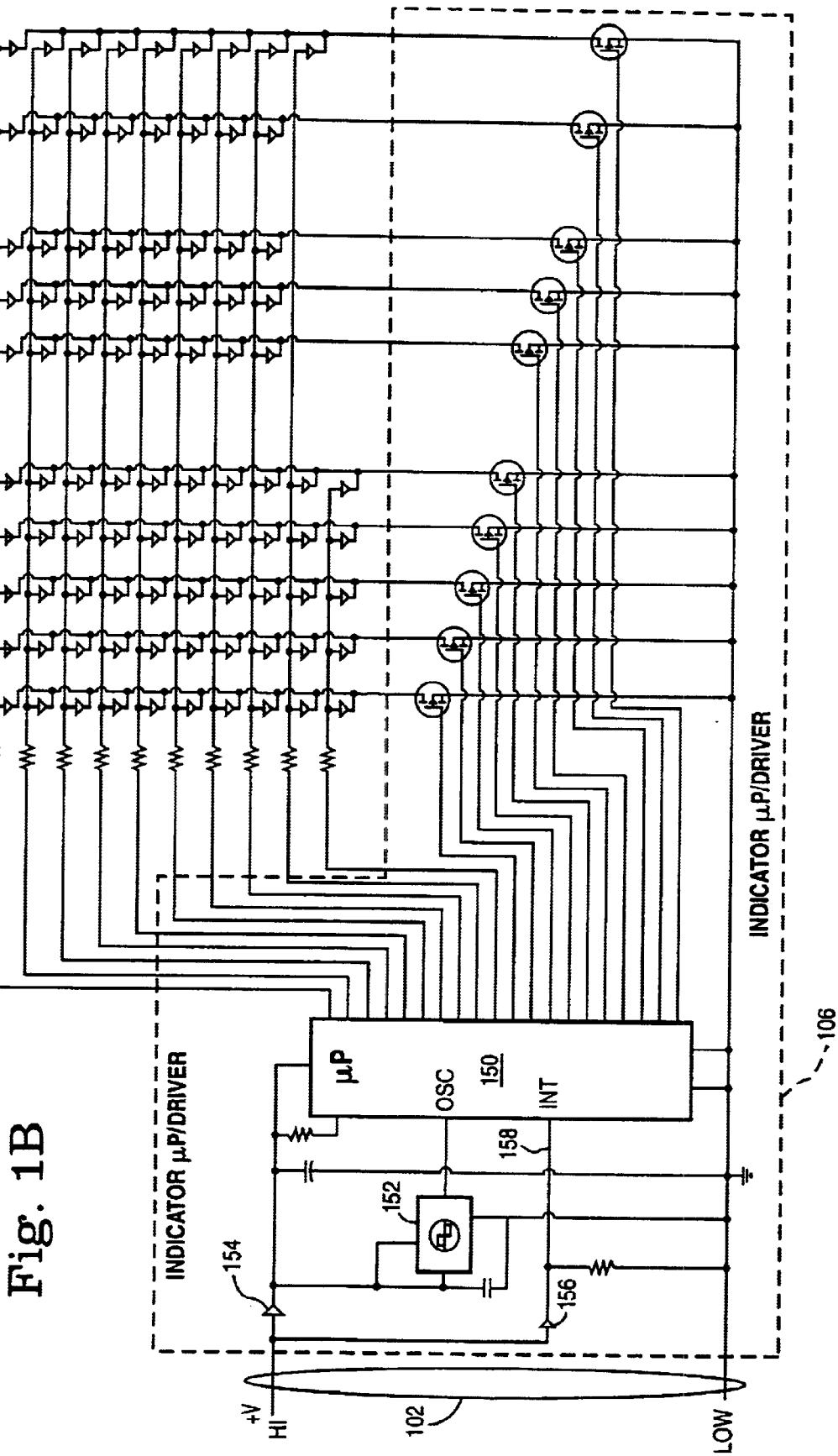
FIG. 1B is a more detailed schematic circuit diagram of an exemplary wind indicator display circuitry for the embodiment of FIG. 1 including the indicator microprocessor/driver.

A more detailed schematic diagram of the wind indicator 104 is provided at FIG. 1B. Here, a micro processor 150 is conventionally connected across a five volt power supply comprising the highland low conductors of transmission line 102. An oscillator 152 and other conventional passive RC components for operating a micro-processor are depicted in FIG. 1B as will be recognized by those in the art. In addition to the usual components, diodes 154 and 156 are included. Diode 154 is included in the power supply circuitry and provides isolation for the data component superimposed on the power supply line. The data component passes via diode 156 to interrupt terminal 158 of the microprocessor 150.

As depicted in FIG. 6, when the wind indicator 104 is started (i.e., by initially receiving power supply) at 650, it is conventionally initialized at 652 and then cyclically receives wind data at 654 and updates the supply driver at 656. The reception/updating processes are endlessly repeated in this exemplary embodiment.

Figure 6B:
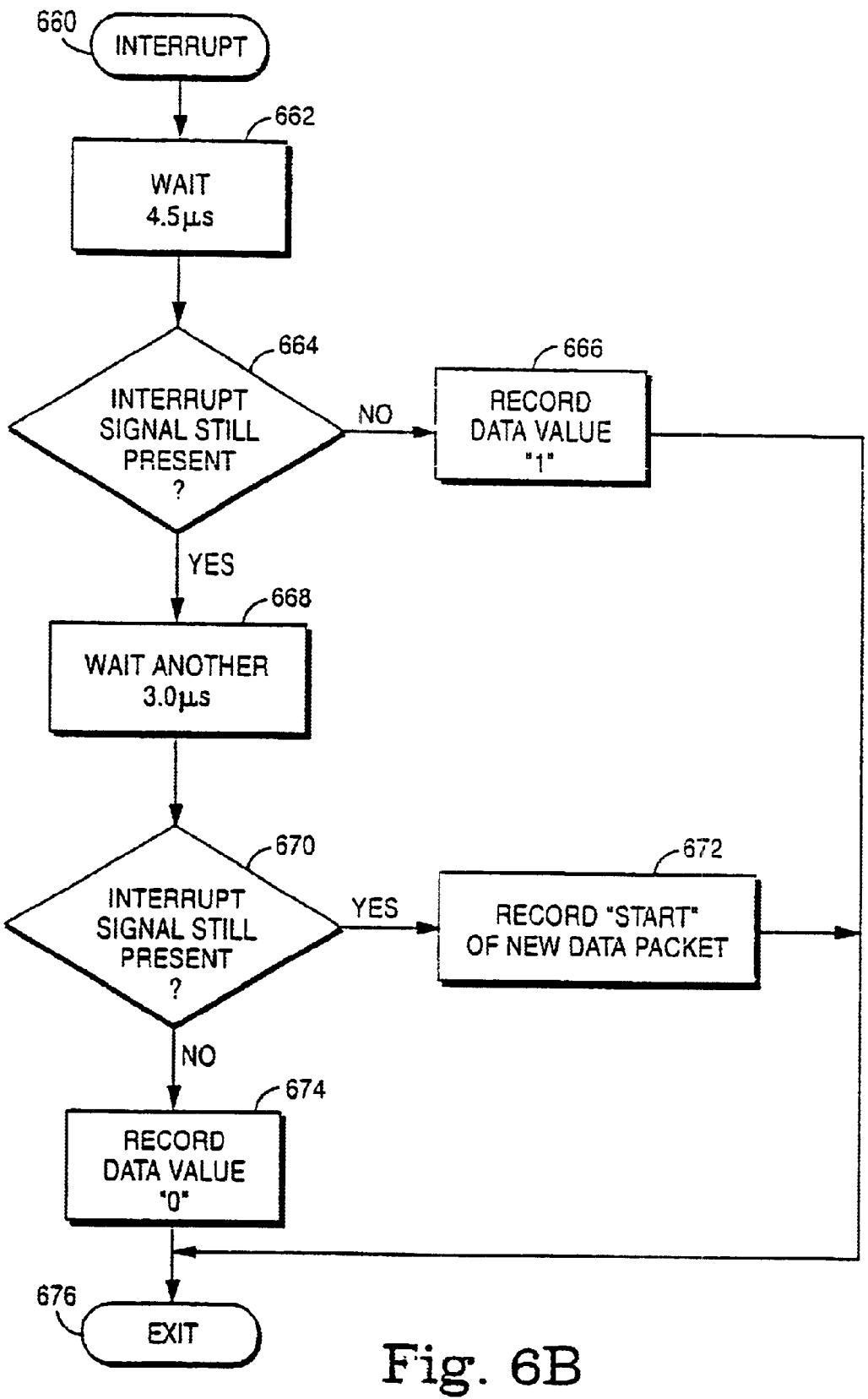
FIG. 6B is a simplified flow diagram of a suitable interrupt program for receiving data at the wind indicator.

As depicted at FIG. 6B, when the microprocessor 150 receives an interrupt signal (e.g., by a temporary brief interruption in the power supply on line 102), it enters an interrupt routine at 660. It then waits 4.5 microseconds at 662 before determining at 664 whether the interrupt signal is still present. If not, then the interrupt signal must have existed for less than 4.5 microseconds and, in the exemplary embodiment, this is consistent with a data value of "1". Accordingly, a data value of "1" is recorded at 666. However, if the interrupt signal is still present at decision point 664, then another wait of 3 microseconds is encountered at 668. After that, another decision is made at 670 as to whether the interrupt signal is still present. If so, then the interrupt signal must have extended beyond 6 microseconds and therefore a "start" of new data packet indication is recorded at 672. On the other hand, if the interrupt signal has disappeared at decision point 670, then an interruption of more than 4.5 µs but less than 7.5 µs must have been encountered and a data value of "0" is recorded at 674 before the interrupt routine is exited at 676.

As will be apparent from FIG. 1B, twenty output port pins of microprocessor 150 are utilized to drive the LED arrays depicted as being associated with wind speed, wind direction, a left wind correction angle and a right wind correction angle. The LEDs are simply connected in a matrix where the cathodes of suitable sub-groups are connected to FETs controlled by one sub-set of the microprocessor output ports while the anodes of a cross direction in the matrix of LED sub-sets is driven by another sub-set of the output ports from the microprocessor. In this manner, desired sub-sets of the LED arrays can be activated or turned "on" so as to emit light.

Figure 2:
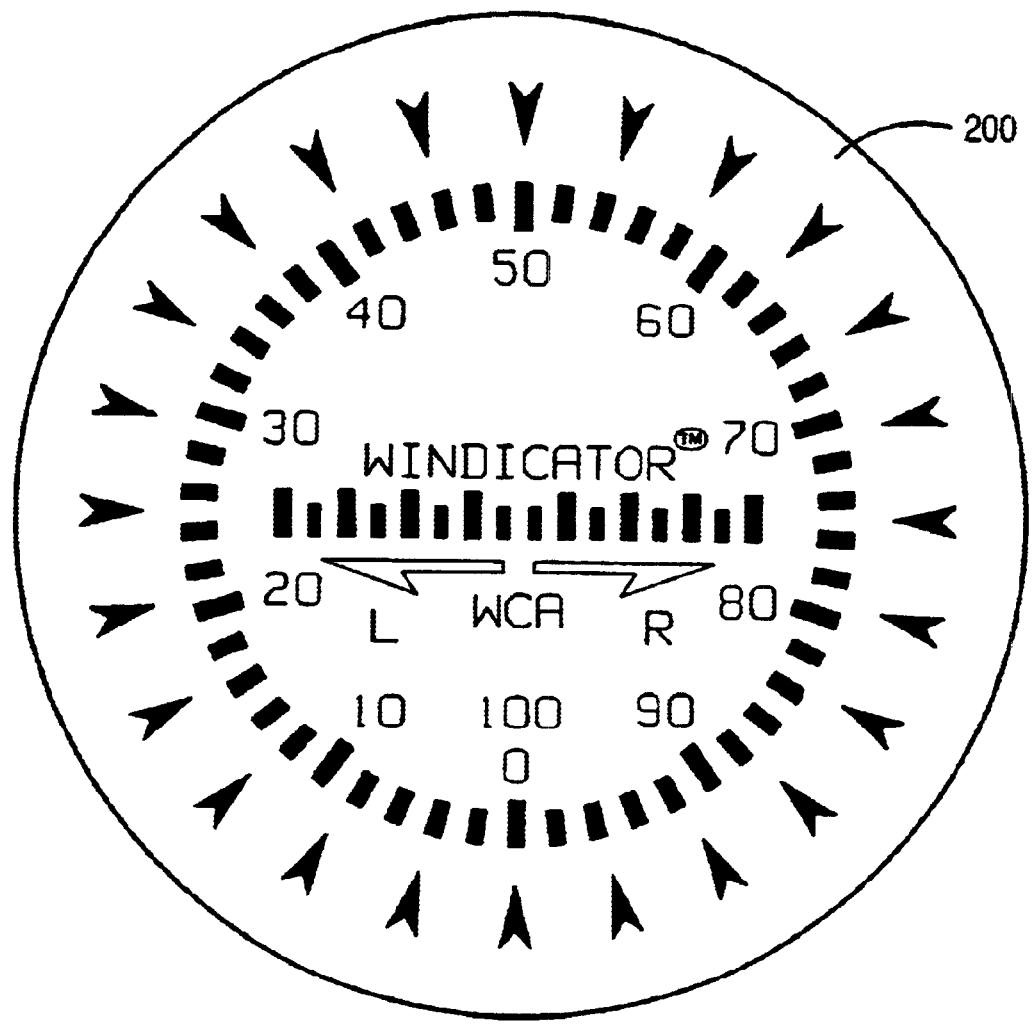
FIG. 2 depicts an exemplary embodiment of printing that may be applied to a transparent or translucent face plate/lens where printed indicia are aligned with light emitting elements so as to enhance the graphical display.
Figure 3:
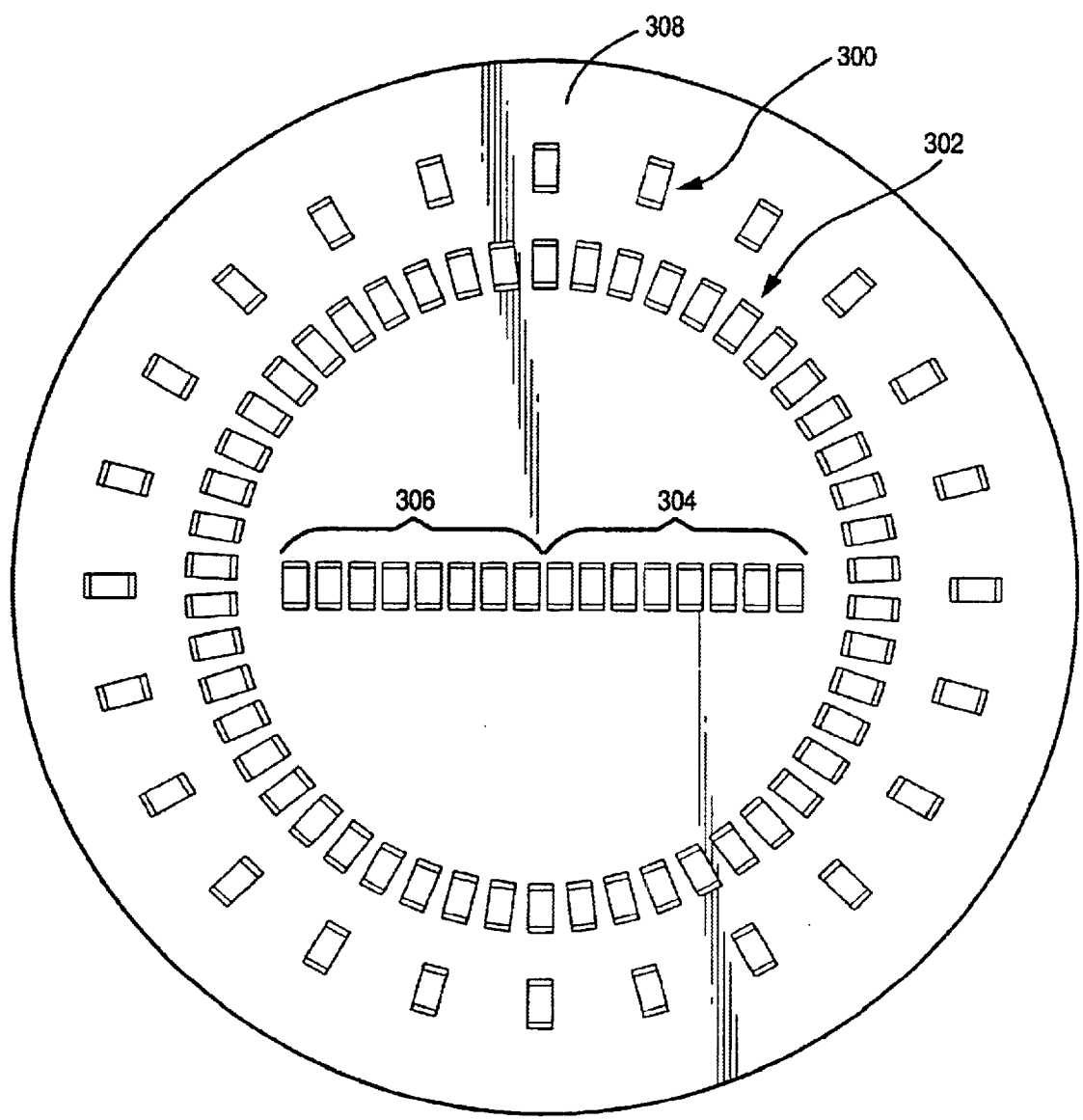
FIG. 3 is an exemplary embodiment showing two concentric circular arrays and one included diametrical linear array of light emitting diodes for use with the exemplary embodiment and disposed on one side of a printed circuit board.

In the exemplary embodiment, a translucent or transparent face on lens 200 is imprinted with graphical indicia as shown in FIG. 2 so as to be aligned with corresponding LEDs mounted on one side of a printed circuit board as depicted in FIG. 3. Here, it will be seen that an outer ring of LEDs 300 is concentric with an inner ring of LEDs 302. The outer ring is aligned with the arrows on the printed lens in FIG. 2 so that a given one LED can be lit to indicate the relative wind direction to within about 15 degrees in the exemplary embodiment. Similarly, a sequence of the required number of LEDs 302 may be simultaneously illuminated so as to provide a circular bar graph depicting wind speed magnitude. As earlier described, the head or tail wind component can be indicated by simply not illuminating (or blinking) one LED in this sequence to indicate the appropriate magnitude of head or tail wind component since that will always be less than or equal to the maximum wind speed magnitude. Of course, if it is equal to the maximum wind speed magnitude, then no LED should be omitted and this itself will be an indication that the head or tail wind component is the full wind magnitude.

Sub-arrays 304 and 306 of light emitting diodes are also mounted on the same side of printed circuit board 308 as depicted in FIG. 3. It will be observed by comparison to FIG. 2 that these light emitting diode sub-arrays are aligned to depict left and right wind correction angles across the central diameter of the display by selectively activating the required number of LEDs to form an effective bar graph to the left or right of the center of the entire array. In the exemplary embodiment, the LEDs represent approximately 5.0 degree. increments of wind correction angle to either the left or the right depending upon which direction is activated.

Figure 4:
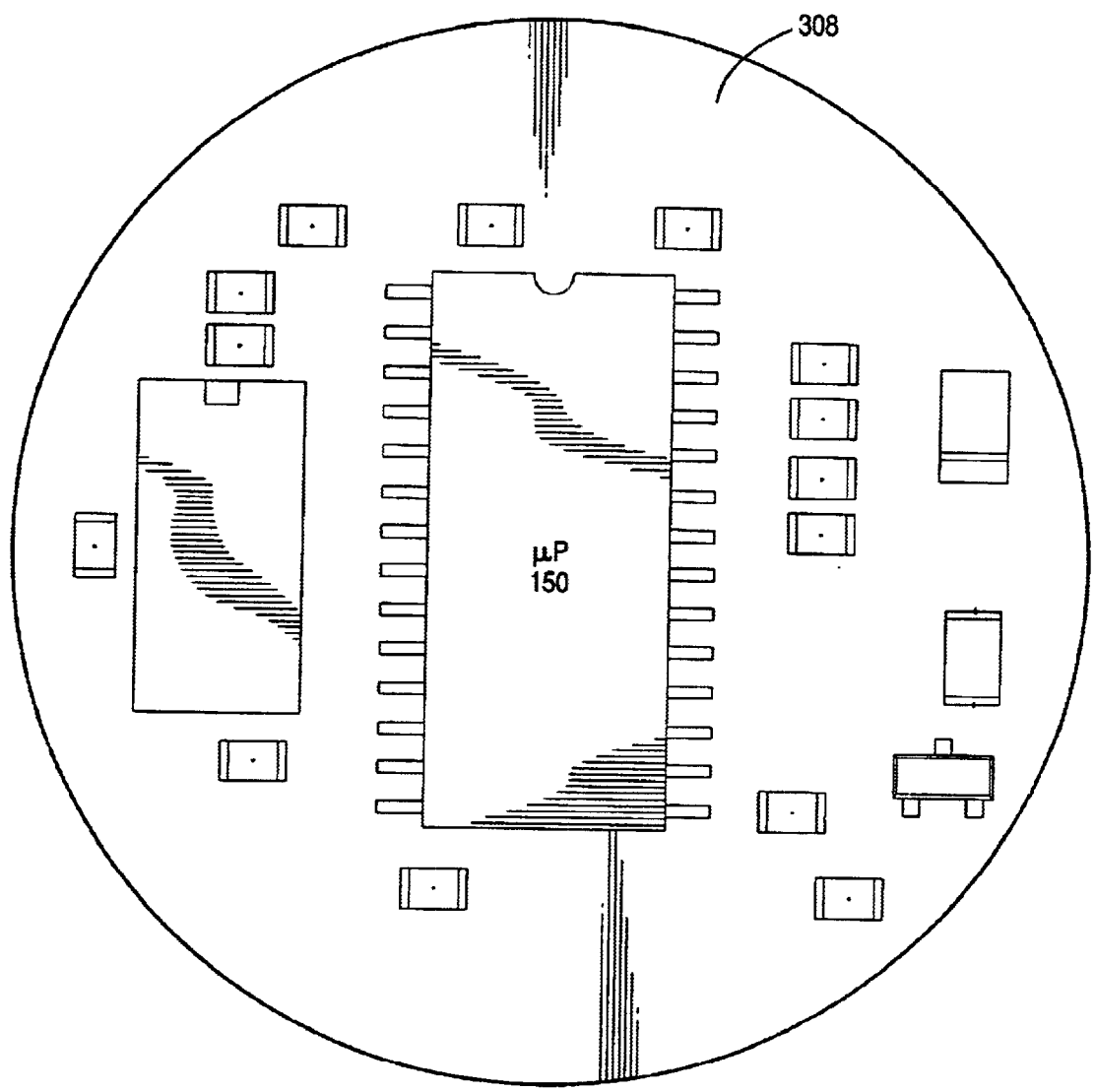
FIG. 4 depicts some of the data processing/driver circuit components that may be mounted on the other side of the same printed circuit board.

As shown in FIG. 4, the reverse side of the printed circuit board 308 is used to mount the microprocessor 150 and other of the required LED driving circuit components. In the exemplary embodiment, a three layer FR 4 printed circuit board is utilized with one ounce copper traces, solder plated and solder masked on both sides for reception of surface mounted LEDs, transistors, microprocessor, etc.

Figure 5A:
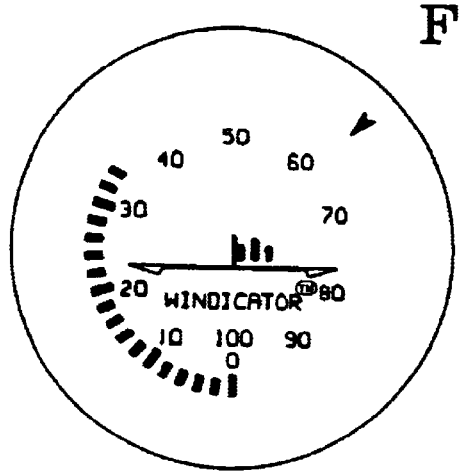
FIGS. 5A–5C depict the graphical display of the exemplary wind indicator for three different sets of wind data.
Figure 5B:
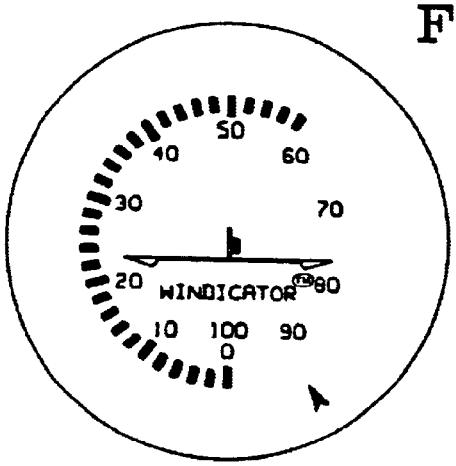
Figure 5C:
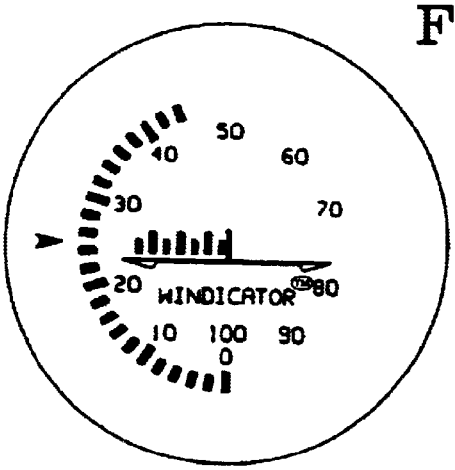

FIGS. 5A through 5C depict the indicator as it displays three different sets of wind data as noted directly on these FIGURES.

Figure 7A:
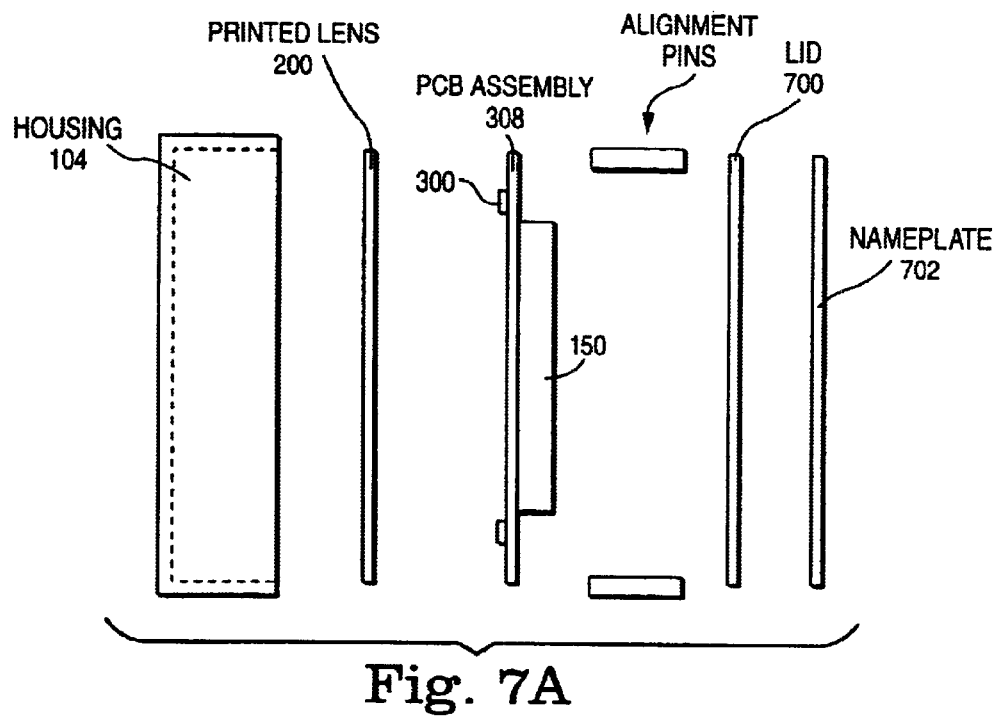
FIG. 7A is an exploded side view of the main components of the wind indicator.
Figures 7B, 7C:
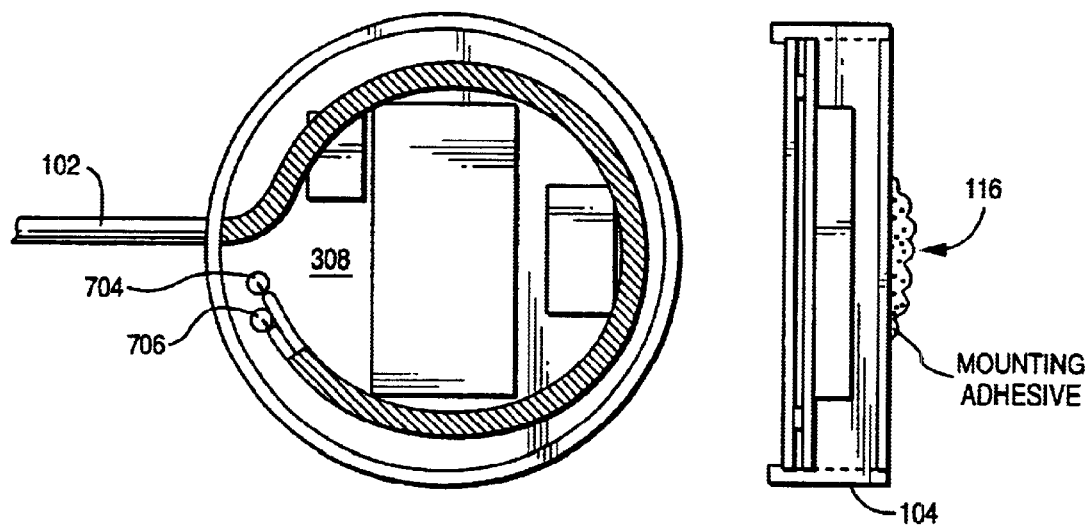
FIG. 7B is a rear view of the assembled indicator with the name plate removed.
FIG. 7C is a schematic side view of the assembled wind indicator.

As shown in FIG. 7A in exploded side view, the wind indicator may include housing 104, printed lens 200 (FIG. 2), the printed circuit board assembly 308, suitable alignment pins, a suitable encapsulating lid 700 and, if desired, name plate 702. These components are shown assembled in a side view of FIG. 7C and in an opened rear view of FIG. 7B. One exemplary embodiment is depicted where the two conductor cable 102 comprises a shielded coaxial cable having two conductors connected on the printed circuit board 308 at 704 and 706.

Figure 8:
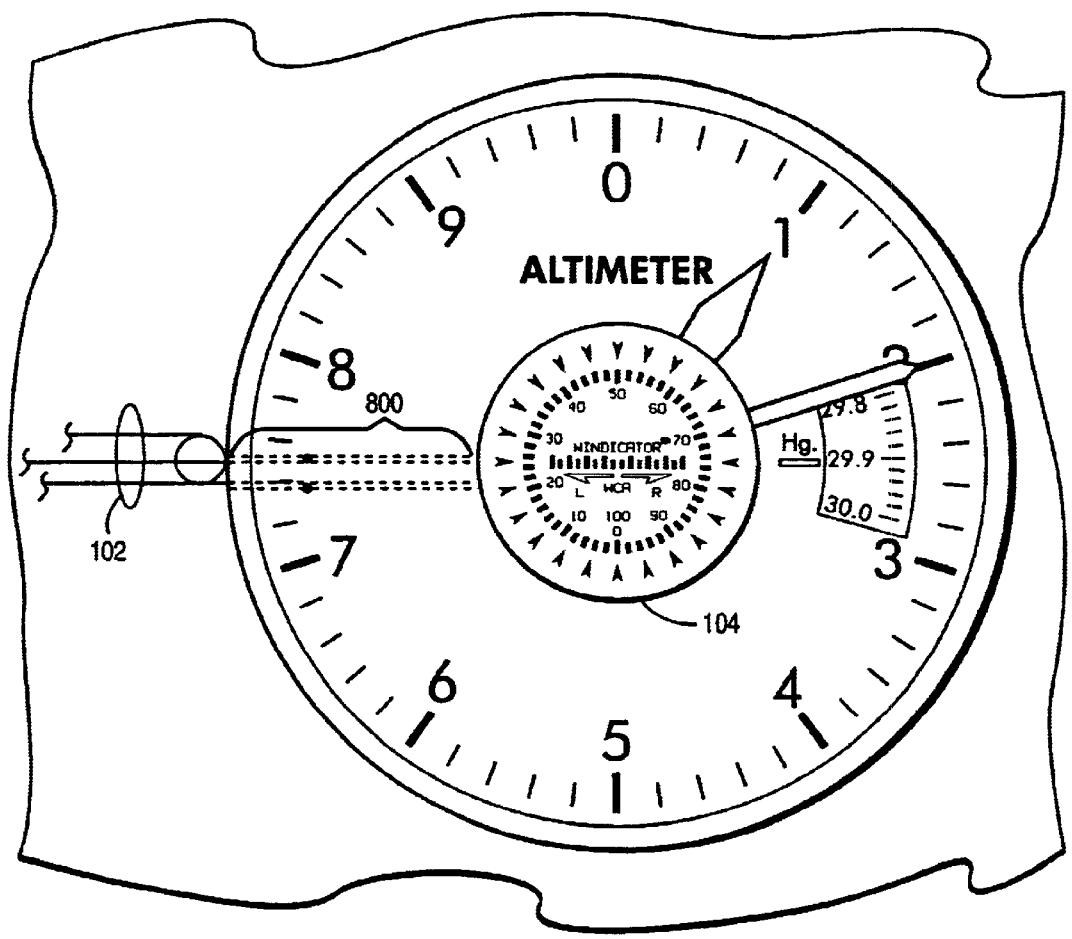
FIG. 8 depicts the wind indicator with a substantially transparent two-conductor ribbon cable umbilical connection affixed to the altimeter of an aircraft instrument panel.

Alternatively, as depicted in FIG. 8, the indicator housing 104 may be adhesively affixed to some other aircraft instrument such as the center of an altimeter as depicted in FIG. 8. In this embodiment, the coaxial cable 102 may be terminated with a short section of nearly invisible ribbon conductor 800. A very thin transparent flexible base may have a pair of thin gold plated conductors connecting the inner and outer conductor of the coaxial cable 102 to connection points 704 and 706 internal of the housing 104 of the wind indicator without substantially obstructing any materially adverse portion of the altimeter or other instrument on which the wind indicator 104 might be superimposed.

Some components used in the exemplary embodiment prototype are noted below:

| | |
|---|---|
| Microprocessor - | Microchip PICl6c62/63 plastic 28 pin SMT |
| LED - | Hewlett Packard Ultra High Brightness SM0603 and SM0805 |
| PCB - | 3 layer FR4 PCB with 1 oz copper traces, solder plated and solder masked both sides |
| Oscillator - | Epson 4 MHz SMT crystal oscillator |
| Optical - | Polaroid 10% neutral gray circular polarizing filter, with anti-glare coating one side |
| Housing - | Aluminum bezel, anodized black |
| Transistors - | Motorola SMT logic N-channel |

Figure 9:
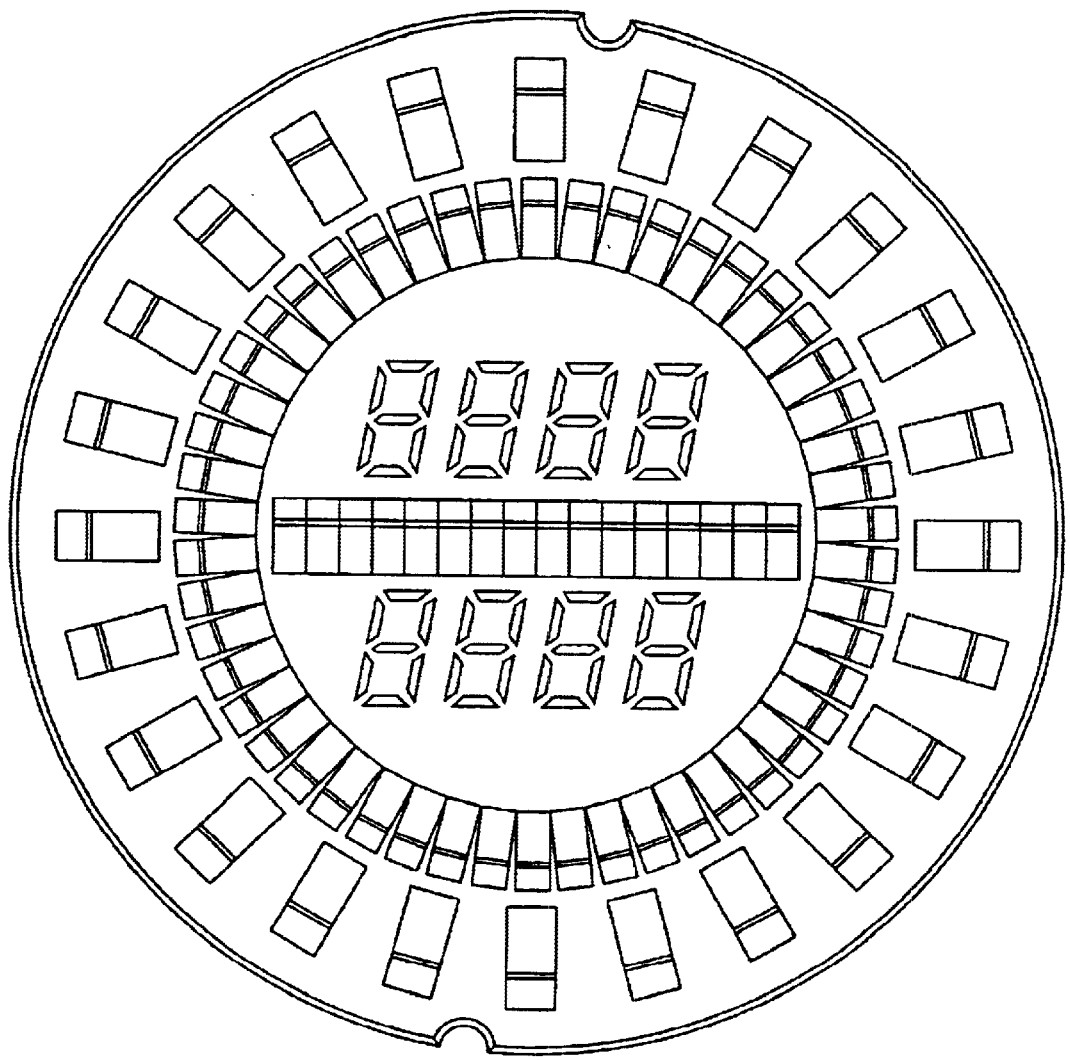
FIG. 9 depicts an alternate exemplary embodiment where the display elements include some digital numeric display elements located in the central portion of the PCB.
Figure 10A:
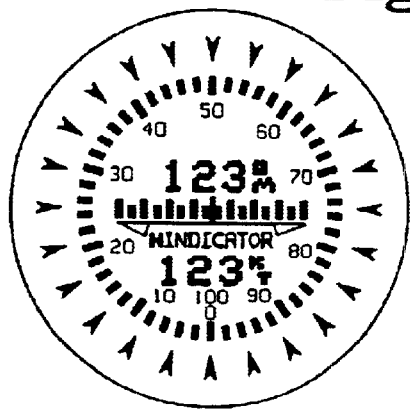
FIGS. 10A–10C depict various possible combined graphic/numeric displays of actual wind data using the FIG. 9 exemplary embodiment.
Figure 10B:
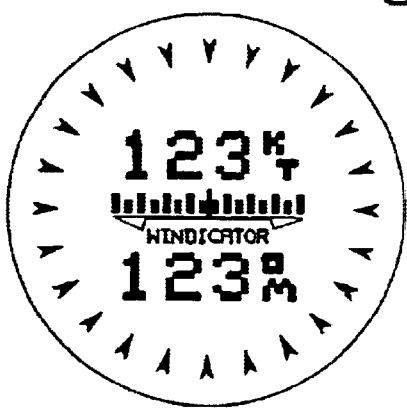
Figure 10C:
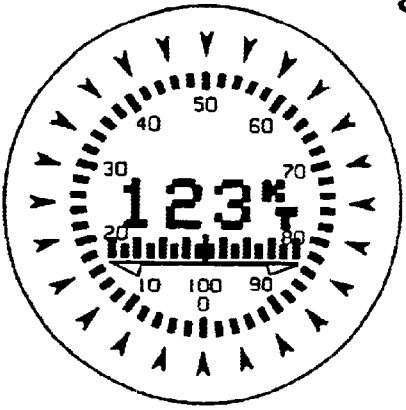

MOSFET
Transparent Interface Cable Gold-deposition Conductors on Transparent Mylar Tape As earlier mentioned, LCD elements can be used instead of LED elements. These can also include alpha-numeric display digits such as the conventional 7-segment digital display elements shown in the central portion of another exemplary embodiment in FIG. 9. Here the display side of the PCB includes four 7-segment digits of alpha-numeric display—both above and below a central linear array of graphic display elements. These can be used to provide two lines of digital data display (e.g., wind speed) as shown in FIG. 10A (still including a circular graphic display) and 10B (eliminating the circular wind speed graphic display and using larger display digits. FIG. 10C depicts another exemplary embodiment where a single line of larger digits is used above an off-center lowered linear array of graphic display elements.

While the invention has been described in connection with what is presently considered to be the most practical and preferred exemplary embodiments, it is to be understood that the invention is not to be limited to the disclosed embodiments, but on the contrary, is intended to cover various modifications and equivalent arrangements included within the spirit and scope of the appended claims.

What is claimed is:

1. An aircraft wind indicator comprising:
    a printed circuit board having first and second surfaces, said first surface being opposed to said second surface;
    wind data display elements disposed on said first surface of said printed circuit board; and
    wind data processing and display driving circuits disposed on said second surface of said printed circuit board.

2. An aircraft wind indicator as in claim 1 disposed in a housing of about 1.3 inches diameter with an adhesive pad on its back side for affixation to an aircraft instrument panel.

3. An aircraft wind indicator as in claim 2 further comprising a two conductor ribbon cable having a substantially transparent base for simultaneously conducting both power and data to the indicator circuits.

4. An aircraft wind indicator as in claim 1 wherein said display elements are disposed to depict wind speed, wind direction and wind correction angle data.

5. An aircraft wind indicator as in claim 1 wherein said display elements comprise solid state elements.

6. An aircraft wind indicator as in claim 5 wherein said display elements include elements arrayed in:
    (i) two concentric circular tracks, and
    (ii) a linear track.

7. An aircraft wind indicator as in claim 1 wherein said display elements comprise LCD elements.

8. An aircraft wind indicator as in claim 1 wherein said display elements include both graphic and alpha-numeric digital display elements.

9. An aircraft wind indicator for use on an aircraft, said aircraft wind indicator comprising:
    visible digital display elements disposed to display wind speed and wind direction, said visible digital display elements being arranged to form an arcuate bar coded display; and
    digital data processing and indicator driving circuits connected to drive said visible digital display elements in accordance with digital data representing wind speed and wind direction when the aircraft is in flight.

10. An aircraft wind indicator as in claim 9 wherein:
    said wind speed and direction are displayed by graphical depictions disposed about two respectively associated concentric loci.

11. An aircraft wind indicator as in claim 10 wherein:
    said wind correction angle is displayed by graphical depictions disposed to the left and to the right of a reference indicia.

12. An aircraft wind indicator as in claim 9 disposed in a housing of about 1.3 inches diameter with an adhesive pad on its back side for affixation to an aircraft instrument panel.

13. An aircraft wind indicator as in claim 9 further comprising a two conductor cable for simultaneously conducting both power and data to the indicator circuits.

14. An aircraft wind indicator for use on an aircraft, said aircraft wind indicator comprising:
    visible digital display elements disposed to display wind speed and wind direction, said visible digital display elements being arranged to form an arcuate bar coded display; and
    digital data processing and indicator driving circuits connected to drive said visible digital display elements in accordance with digital data representing wind speed and wind direction when the aircraft is in flight;
    wherein said visible digital display elements are also disposed to display a wind correction angle and said digital data processing and indicator driving circuits are also connected to drive said visible digital display elements in accordance with digital data representing a wind correction angle when the aircraft is in flight.

15. An aircraft wind indicator as in claim 14 wherein:
    said visible indicators comprise at least one of solid state LED and LCD elements arrayed on one side of a printed circuit board; and
    said data processing and indicator driving circuits are disposed on the other side of said printed circuit board.

16. An aircraft wind indicator as in claim 14 wherein:
    said wind correction angle is displayed by graphical depictions disposed to the left and to the right of a reference indicia.

17. An aircraft wind indicator as in claim 14 including display elements defining alpha-numeric digits.

18. An aircraft wind indicator comprising:
    a housing containing a plurality of digital display elements and driving circuits therefor disposed for selective activation of said elements to represent the speed and direction of wind with respect to a moving airborne aircraft.

19. An aircraft wind indicator as in claim 18 wherein said display elements and driving circuits are configured to also represent a requisite wind correction offset aircraft steering angle for maintaining a predetermined direction of aircraft movement with respect to the ground.

20. An aircraft wind indicator as in claim 19 wherein said display elements are disposed to provide graphic data depiction.

21. An aircraft wind indicator as in claim 19 wherein at least some of said display elements are disposed to provide a display of numeric digits.

22. An aircraft wind indicator as in claim 19 wherein said elements are arrayed:
    (i) in two concentric circular tracks to respectively depict the magnitudes of wind speed and direction; and
    (ii) in a third track to depict a left or right wind correction angle.

23. An aircraft wind indicator as in claim 22 wherein said third track is a linear track with elements extending to the left and right of a reference point for depicting the wind correction angle direction and magnitude.

24. An aircraft wind indicator as in claim 19 wherein:
    said display elements include at least one of LED and LCD elements mounted on one side of a printed circuit board; and
    said driving circuits include solid state data processing and display element driver circuits mounted on the opposite side of said circuit board.

25. An aircraft wind indicator as in claim 24 wherein said display elements are directed toward a front side of said housing and, when activated, viewable through a substrate imprinted with graphical symbols aligned with said display elements.

26. An aircraft wind indicator as in claim 25 wherein a back side of said housing includes a pad of adhesive for affixing it to an aircraft instrument panel.

27. An aircraft wind indicator as in claim 18 further comprising a two conductor cable for simultaneously conducting both power and data to the driving circuits.

28. An aircraft wind indicator for use on an aircraft, said aircraft wind indicator comprising:
- a data input port,
- a first array of controllable discrete display elements arranged to graphically depict wind direction data;
- a second array of controllable discrete display elements arranged to graphically depict wind speed data when the aircraft is airborne;
- a third array of controllable discrete display elements arranged to graphically depict wind correction angle data; and
- data processing and display element driving circuits connected between said data input port and said arrays.

29. An aircraft wind indicator as in claim 28 wherein said data input port comprises a pair of electrical conductors supplying power as well as wind-related data to said data processing and light source driving circuits.

30. An aircraft wind indicator as in claim 28 wherein said discrete display elements are at least one of LED and LCD elements.

31. An aircraft wind indicator as in claim 28 wherein said discrete display elements include elements arranged to display numeric digits.

32. An aircraft wind indicator as in claim 28 wherein:
- said data processing and display element driving circuits comprise a micro-processor and other drive circuit components disposed on one side of a printed circuit board; and
- said arrays of display elements are disposed on an opposite side of said printed circuit board.

33. An aircraft wind indicator as in claim 28 wherein said first array of display elements is disposed along a circular locus.

34. An aircraft wind indicator as in claim 28 wherein said second array of display elements is disposed along a circular locus.

35. An aircraft wind indicator as in claim 28 wherein said first and second arrays of display elements are respectively disposed along concentric circular loci.

36. An aircraft wind indicator as in claim 35 wherein said first array of display elements is disposed along a circular locus that is of greater diameter than that of the second array.

37. An aircraft wind indicator as in claim 36 wherein said third array of display elements is disposed along a linear locus.

38. An aircraft wind indicator as in claim 37 wherein said third array of display elements includes a first sub-array arranged to depict a right wind correction angle and a second sub-array arranged to depict a left wind correction angle.

39. An aircraft wind indicator as in claim 28 wherein said third array of display elements is disposed along a linear locus.

40. An aircraft wind indicator as in claim 39 wherein said third array of display elements includes a first sub-array arranged to depict a right wind correction angle and a second sub-array arranged to depict a left wind correction angle.

41. An aircraft wind indicator as in claim 28 wherein said data input port comprises a two conductor ribbon cable that is substantially invisible to the human eye at normal viewing conditions and at a distance of approximately two feet.

42. An aircraft wind indicator as in claim 28 wherein said data input port also comprises the power supply for said data processing and display element driving circuits which are configured to detect short power interruptions of at least two different durations as input digital data.

43. An aircraft wind indicator as in claim 28 wherein said arrays and said data processing and display element driving circuits are all mounted on a single common printed circuit board.

44. An aircraft wind indicator as in claim 43 wherein said printed circuit board is disposed within a cylindrical housing having a see-through side for viewing said arrays.

45. An aircraft wind indicator as in claim 43 wherein said printed circuit board is disposed within a housing having one see-through side for viewing the arrays and an opposite mounting side adapted for affixation to an aircraft instrument panel.

46. A method for displaying wind data in the cockpit of an aircraft, said method comprising:
- generating digital wind data representing the direction and magnitude of wind, being encountered by the aircraft when the aircraft is airborne, and correction angle data;
- periodically sending said generated digital wind data to a visual indicator in the aircraft cockpit; and
- receiving and processing said digital data at the indicator with a micro-processor to drive plural arrays of display elements at the indicator which thereby simultaneously provide a visual depiction of said wind data.

47. A method as in claim 46 wherein:
- wind direction is depicted by selectively activating display elements arrayed in a first circular ring,
- wind magnitude is depicted by selectively activating display elements arrayed in a second circular ring; and
- said wind correction angle is depicted by selectively activating display elements arrayed in a line.

48. An aircraft wind indicator for use on an aircraft, said aircraft wind indicator comprising:
- visible display elements disposed to display a wind correction angle; and
- data processing and indicator driving circuits connected to drive said visible display elements in accordance with data representing a wind correction angle when the aircraft is in flight.

49. An aircraft wind indicator as claimed in claim 48, said visible display elements being digital for digitally displaying the wind correction angle.

50. An aircraft wind indicator as claimed in claim 48, said visible display elements also being disposed to display wind speed and wind direction.

51. An aircraft wind indicator as claimed in claim 50, said visible display elements being arranged to form an arcuate bar coded display.

* * * * *